United States Patent
Li et al.

(10) Patent No.: US 8,849,010 B2
(45) Date of Patent: Sep. 30, 2014

(54) METHOD AND SYSTEM FOR RECTIFYING IMAGES

(75) Inventors: Kai Li, Shenzhen (CN); Jing Wang, Shenzhen (CN); Yuan Liu, Shenzhen (CN); Ping Fang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1018 days.

(21) Appl. No.: 12/874,468

(22) Filed: Sep. 2, 2010

(65) Prior Publication Data

US 2010/0329543 A1 Dec. 30, 2010

Related U.S. Application Data

(63) Continuation of application No. PCT/CN2008/073404, filed on Dec. 9, 2008.

(30) Foreign Application Priority Data

Mar. 3, 2008 (CN) .......................... 2008 1 0081643

(51) Int. Cl.
*G06K 9/00* (2006.01)
*G06T 5/00* (2006.01)
*G06T 3/00* (2006.01)
(52) U.S. Cl.
CPC ....... *G06T 5/006* (2013.01); *G06T 2207/10012* (2013.01); *G06T 3/0068* (2013.01)
USPC ........................................... 382/154; 348/42
(58) Field of Classification Search
CPC .................................................... G06T 3/0068

USPC ................ 382/154; 345/419; 356/12; 348/42
See application file for complete search history.

(56) References Cited

U.S. PATENT DOCUMENTS

| 6,608,923 | B1 | 8/2003 | Zhang et al. |
| 7,003,150 | B2 * | 2/2006 | Trajkovi ....................... 382/154 |
| 7,113,632 | B2 * | 9/2006 | Lee et al. ....................... 382/154 |
| 8,401,281 | B1 * | 3/2013 | Payton .......................... 382/154 |
| 2002/0024516 | A1 * | 2/2002 | Chen et al. .................... 345/419 |
| 2012/0155750 | A1 * | 6/2012 | Kim et al. ..................... 382/154 |

FOREIGN PATENT DOCUMENTS

| CN | 1798957 A | 7/2006 |
| CN | 101236653 A | 8/2008 |
| EP | 1235439 A2 | 8/2002 |
| WO | 2004098204 A1 | 11/2004 |

OTHER PUBLICATIONS

Andrea Fusiello et al., A compact algorithm for rectification of stereo pairs, Mar. 2, 2000, total 7 pages.

(Continued)

*Primary Examiner* — Samir Ahmed
(74) *Attorney, Agent, or Firm* — Brinks Gilson & Lione

(57) ABSTRACT

The present invention relates to a method and a system for rectifying images. An original stereo image pair is obtained, and the epipolar lines corresponding to the original stereo image pair are parallelized to obtain a first transformed stereo image pair. Epipolar lines corresponding to the first transformed stereo image pair are collinearized to obtain a second transformed stereo image pair. The present invention parallelizes and collinearizes the epipolar lines corresponding to the stereo image pair after the images are rectified.

12 Claims, 10 Drawing Sheets

(56) References Cited

OTHER PUBLICATIONS

Department of Electronics and Communication Engineering ,Sun Yat-sen University , Guangdong 510275, China: "A Rectification Algorithm for Stereo Image Pairs," Sep. 2003, total 3 pages.
Han Wei, Zheng Jiang-bin, Li Xiu-xiu, Fast and accurate stereo matching algorithm based on epipolar line restriction, Computer Engineering and Applications, 2008, total 3 pages.
Office action issued in corresponding Chinese Patent Application No. 200810081643.8, May 8, 2009 and English translation thereof, total 15 pages.
Search report issued in corresponding International Patent Application No. PCT/CN2008/073404, Mar. 5, 2009, total 4 pages.
Office Action issued in corresponding European Patent Application No. 08873164.1, mailed Sep. 14, 2012.
Extended European Search Report issued in corresponding European Patent Application No. 08873164.1, mailed Nov. 18, 2010.
Written Opinion of the International Searching Authority issued in corresponding PCT Patent Application No. PCT/CN2008/073404, mailed Mar. 5, 2009.
Isgrò et al., "On Projective Rectification" Image Processing and Its Applications, Conference Publication No. 465, IEE 1999.
D. V. Papadimitriou et al,: "Epipolar Line Estimation and Rectification for Stereo Image Pairs", Apr. 1996.
R. I. Hartley et al, "Theory and practice of projective rectification" International Journal of Computer Vision 35(2), 1999.
Birchfield, "An Introduction to Projective Geometry (for Computer Vision)" Mar. 12, 1998. XP-002195387.
Géraud et al., "Une Technique de Rectification sans Contrainte" Seizieme Colloque Gretsi, Grenoble, Sep. 15-19, 1997. XP-002603297.
Zhengyou Zhang, "Determining the Epipolar Geometry and its Uncertainty: A Review" International Journal of Computer Vision, 27(2), Mar. 1, 1998.
Fusiello et al., "A Compact Algorithm for Rectification of Stereo Pairs" Machine Vision and Applications, vol. 12, 2000.
Marc Pollefeys et al, "A simple and efficient rectification method for general motion" 1999.
Charles Loop et al, "Computing Rectifying Homographies for Stereo Vision", IEEE 1999.
Hartley et al., "Epipolar Geometry and the Fundamental Matrix" Multiple View Geometry in Computer Vision, Chapter 9, 2003.
Jiyong et al., "A New Rectification Method of Stereo Pairs Without Calibration for Cameras" Acta Optica Sinica, vol. 24, No. 5, May 2004.
Dhond et al., Structure from Stereo—A Review IEEE Transactions on Systems, Man, and Cybernetics, vol. 19, No. 6, Nov./Dec. 1989. XP003007570.
Luo et al., "A Rectification Algorithm for Stereo Image Pairs" Acta Scientiarum Naturalium Universitatis Sunyatseni, vol. 42, No. 5, Sep. 2003.

* cited by examiner

METHOD AND SYSTEM FOR RECTIFYING IMAGES

CROSS-REFERENCE TO RELATED APPLICATIONS

This application is a continuation of International Application No. PCT/CN2008/073404, filed on Dec. 9, 2008, which claims priority to Chinese Patent Application No. 200810081643.8, filed on Mar. 3, 2008, both of which are hereby incorporated by reference in their entireties.

FIELD OF THE INVENTION

This invention relates to an image rectification technology, and in particular, to a method and a system for rectifying images.

BACKGROUND

The stereo image pair is used to record the same scene shot by video cameras at different positions. Image points of the same object point on two different imaging planes are called corresponding points, and range information about the scene can be obtained from disparity of the corresponding points in the stereo image pair. As the stereo image pair provides epipolar geometric constraints, the corresponding points can be obtained from the corresponding epipolar lines. Generally, two video cameras are required in a stereo vision system. FIG. 1 shows a model of a stereo vision system including two video cameras, where (o, o') denotes the optical centers of the video cameras, point M is a point in the space, and m and m' respectively denote the images of the space point M shot by the two video cameras from two opposite perspectives.

In the coordinate system of the video camera, the epipolar line constraints exist: The line oo' intersects the image planes R and R' at points e and e', which are called epipoles. Lines through the epipoles on the two images are called epipolar lines. For any point on the first image plane, its corresponding point on the other image plane is bound to locate on its epipolar line. As shown in FIG. 1, for point m, line l that is through point m and point e is an epipolar line of the first image plane; point m' is the corresponding point of point m and locates on line l' that is through point e'. That is, mapping between point m' and epipolar line l' of the second image plane exists.

For an ideal stereo image pair, only horizontal disparity exists between the corresponding points. To match the ideal stereo image pair, it is only necessary to identify the corresponding points along the horizontal scanning line of the image. Therefore, the ideal stereo image pairs can be matched at a high speed, and ambiguity of matching can be eliminated. Thus, the process of rectifying the stereo image pair is a process of transforming a general stereo image pair into an ideal stereo image pair.

A stereo image pair can be rectified in two scenarios: one refers to a video camera that is calibrated, and the other refers to a video camera that is not calibrated.

In the case of a video camera that is calibrated, the stereo image pair is rectified after the internal and external parameters of the video camera are obtained. The rectification process includes: projecting the original images onto a public image plane, where the direction of this image plane is determined by the cross product by the baseline of the binocular stereo vision system and the intersecting line of two original image planes.

In the case of a video camera that is not calibrated and a series of corresponding points are obtained, before the stereo image pair is rectified, angular point sets need to be obtained from the image pair through the angular point extraction algorithm respectively, mapping between angular points in the two angular point sets needs to be established through the feature matching method, and then point pair sets are established, in which two corresponding angular points form a point pair.

The inventor finds the following problems in the prior art.

(1) In rectifying the stereo image pair, epipolar lines corresponding to the stereo image pair can be made parallel to each other only, but not located on the same horizontal line.

(2) The conventional algorithm for rectifying the stereo image pair is of poor adaptability, and can achieve good effect only when the binocular video camera platform is constructed well. When the binocular video camera platform is distinctly inferior to an ideal binocular video camera or is not well constructed due to mechanical or manual factors, rectification of the stereo image pair is not good.

(3) Application to the stereo video is not taken into account. Generally, most of the rectified images may generate black edges, but the method for favorably trimming the black edges is not taken into account.

SUMMARY

Method and apparatus are provided for rectifying images is provided in the embodiments of the present invention to parallelize and collinearize the epipolar lines corresponding to the stereo image pair after the images are rectified.

In one aspect of the invention, a method for rectifying images is provided in which:

an original stereo image pair is obtained;

epipolar lines corresponding to the original stereo image pair are parallelized to obtain a first transformed stereo image pair; and the epipolar lines corresponding to the first transformed stereo image pair are collinearized to obtain a stereo image pair transformed for the second time.

In another aspect of the invention, a system for rectifying images is provided that includes:

an image pair obtaining module, adapted to obtain an original stereo image pair;

an epipolar line parallelizing module, connected to the image pair obtaining module and adapted to parallelize the epipolar lines corresponding to the original stereo image pair to obtain a first transformed stereo image pair; and an epipolar line collinearizing module, connected to the epipolar line parallelizing unit or module and adapted to collinearize the epipolar lines corresponding to the first transformed stereo image pair to obtain a second transformed stereo image pair.

Compared with the prior art, according to the technical solution provided in the embodiments of the present invention, the epipolar lines corresponding to the original stereo image pair are parallelized to obtain the first transformed stereo image pair. Then, the epipolar lines corresponding to the first transformed stereo image pair are collinearized to obtain the second transformed stereo image pair. By parallelizing and collinearizing the epipolar lines, the stereo image pair obtained when the binocular video camera platform is poorly constructed can be well rectified.

DETAILED DESCRIPTION OF THE EMBODIMENTS

The embodiments of the present invention is further elaborated in the following with reference to accompanying drawings and embodiments:

A method for rectifying images is provided in the embodiments of the present invention as described in embodiments 1-5 and FIGS. 2-6.

Figure 1:
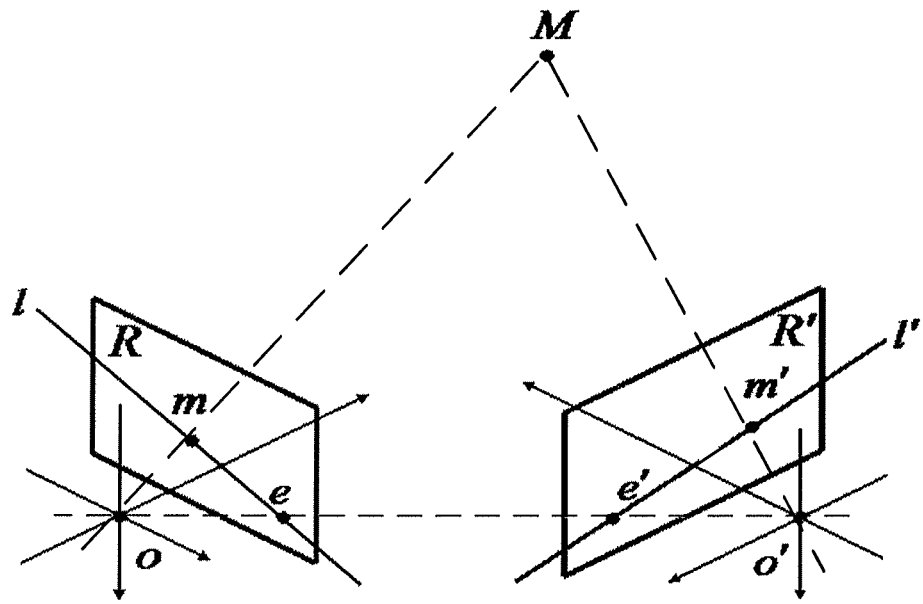
FIG. 1 shows the principle of epipolar line constraints in the prior art.
Figure 2:
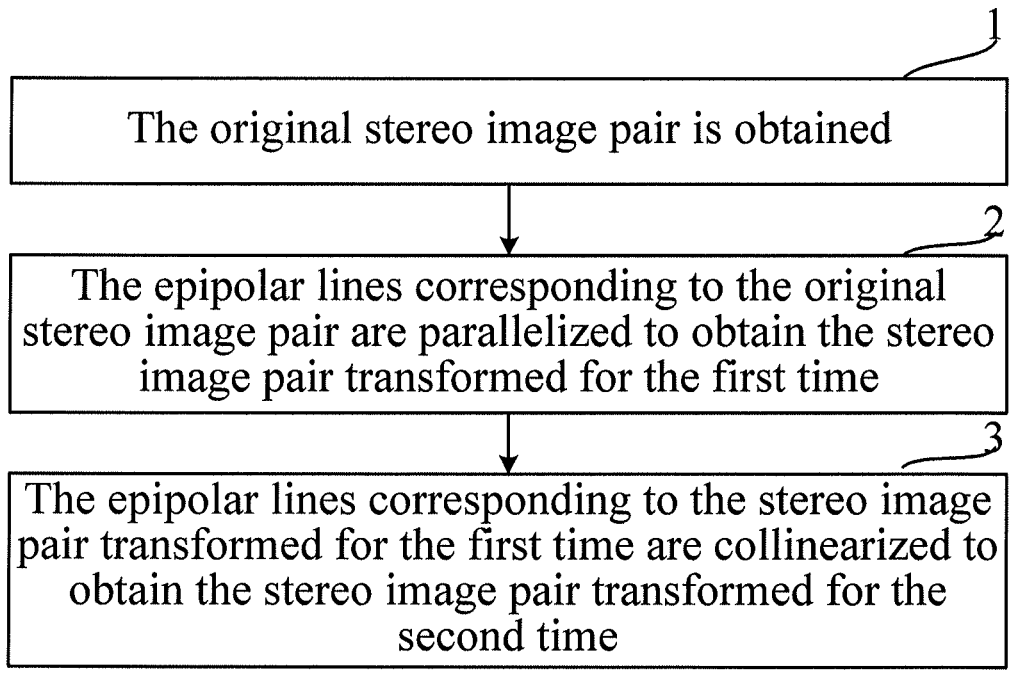
FIG. 2 shows a flowchart of a method for rectifying images according to a first embodiment of the present invention.

FIG. 2 shows a flowchart of a method for rectifying images according to a first embodiment of the present invention. As shown in FIG. 2, a method according to this embodiment includes the following blocks.

Block 1: The original stereo image pair is obtained.

Block 2: The epipolar lines corresponding to the original stereo image pair are parallelized to obtain the stereo image pair transformed for the first time.

Block 3: The epipolar lines corresponding to the stereo image pair transformed for the first time are collinearized to obtain the stereo image pair transformed for the second time.

In this embodiment, the epipolar lines corresponding to the original stereo image pair are parallelized to obtain the stereo image pair transformed for the first time ("first transformed stereo image pair"). Then, the epipolar lines corresponding to the first transformed stereo image pair are collinearized to obtain the stereo image pair transformed for the second time ("second transformed stereo image pair"). By parallelizing and collinearizing the epipolar lines corresponding to the obtained stereo image pair, the stereo image pair with better rectification effect is obtained. In particular, the stereo image pair can be rectified well when the binocular video camera platform is poorly constructed.

Figure 3:
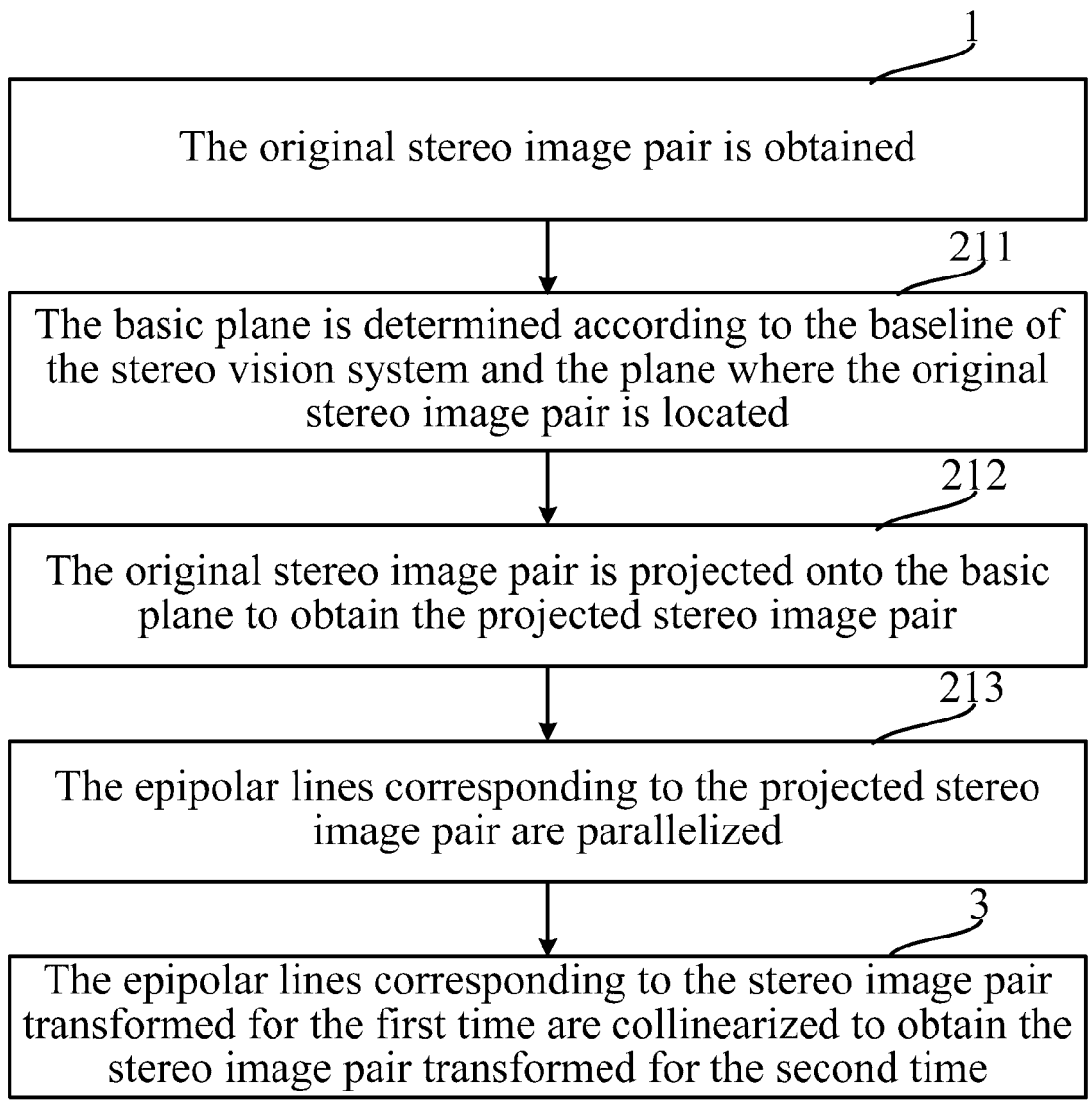
FIG. 3 shows a flowchart of a method for rectifying images according to a second embodiment of the present invention.

FIG. 3 shows a flowchart of a method for rectifying images according to a second embodiment of the present invention. In this embodiment as shown in FIG. 3, block 2 as described in the method for rectifying images according to the first embodiment of the present invention specifically includes the following blocks:

Block 211: A basic plane is determined by the baseline of the stereo vision system and the plane where the original stereo image pair is located.

Block 212: The original stereo image pair is projected onto the basic plane to obtain the projected stereo image pair.

Block 213: The epipolar lines corresponding to the projected stereo image pair are parallelized.

In this embodiment, stereo images are rectified through calibration. That is, the basic plane is determined by the internal and external parameters (for example, the baseline of the stereo vision system) of the binocular video cameras and the plane where the original stereo image pair is located. This basic plane can be determined by the cross product by the baseline of the binocular stereo vision system and the intersecting line of two original image planes.

In the foregoing embodiment, after the original stereo image pair is obtained in block 1, the stereo image point pair set is created.

Figure 4:
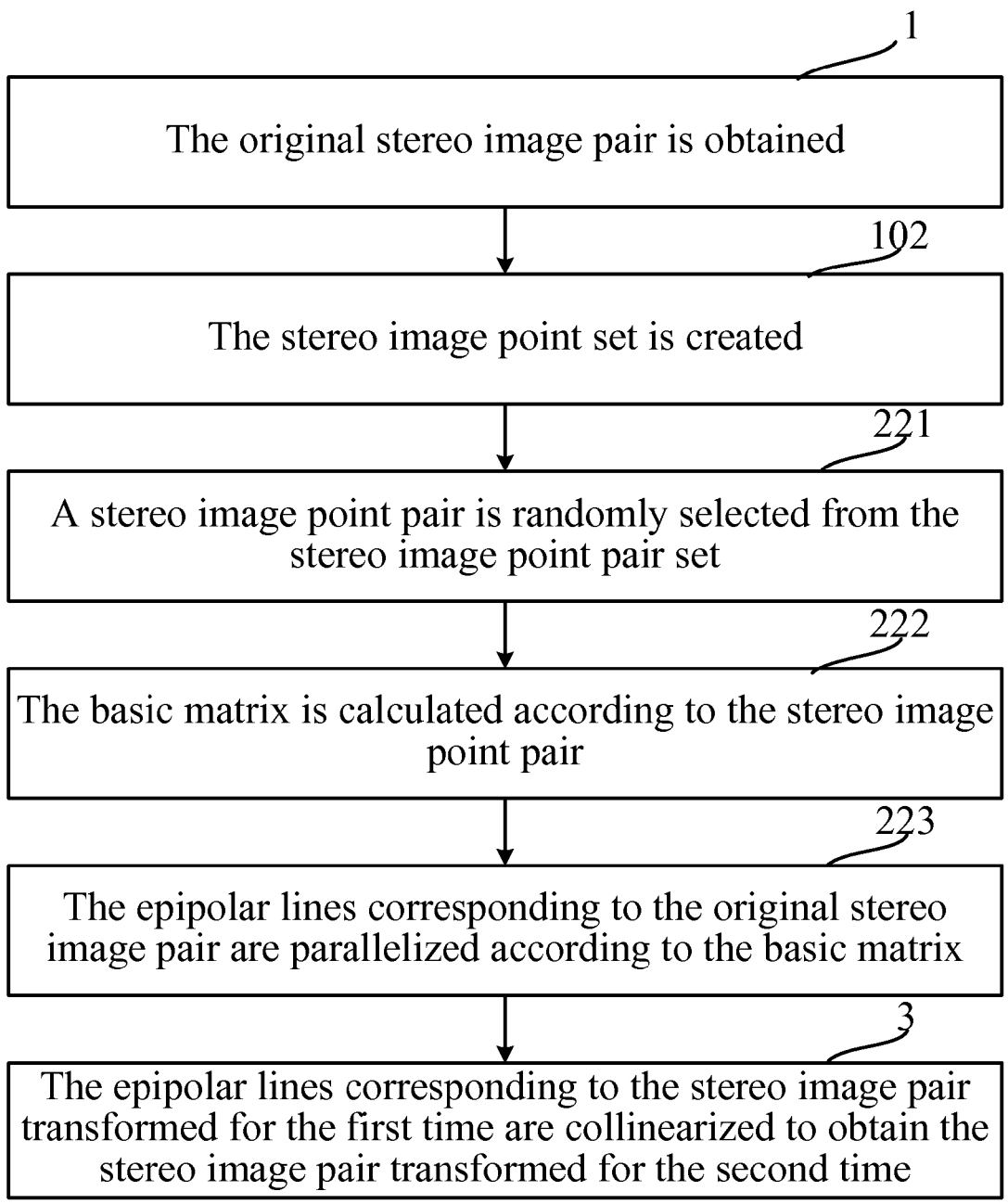
FIG. 4 shows a flowchart of a method for rectifying images according to a third embodiment of the present invention.

FIG. 4 shows a flowchart of a method for rectifying images according to a third embodiment of the present invention. In this embodiment as shown in FIG. 4, the following step is further performed between block 1 and block 2 as described in the method for rectifying images according to the first embodiment of the present invention:

Block 102: The stereo image point pair set is created. The process of creating the image point pair set is as follows: obtaining the angular point sets through the angular point extraction algorithm, establishing mapping between angular points in the two angular point sets through the feature matching method, and then creating point pair sets, in which two corresponding angular points form a point pair.

When the stereo image point pair set is available, block 2 may specifically include the following blocks:

Block 221: A stereo image point pair is randomly selected from the stereo image point pair set.

Block 222: A basic matrix is calculated according to the stereo image point pair.

Block 223: The epipolar lines corresponding to the original stereo image pair are parallelized according to this basic matrix.

In this embodiment, the stereo image is rectified without calibration, with the premises that a point pair set that contains a series of coordinates of corresponding points is given. The basic matrix is calculated according to any stereo image point pair from the stereo image point pair set. Then, the epipolar lines corresponding to the original stereo image pair are parallelized according to this basic matrix. Compared with the method for rectifying images according to the second embodiment, this embodiment provides good adaptability as images are rectified without calibration.

Figure 5:
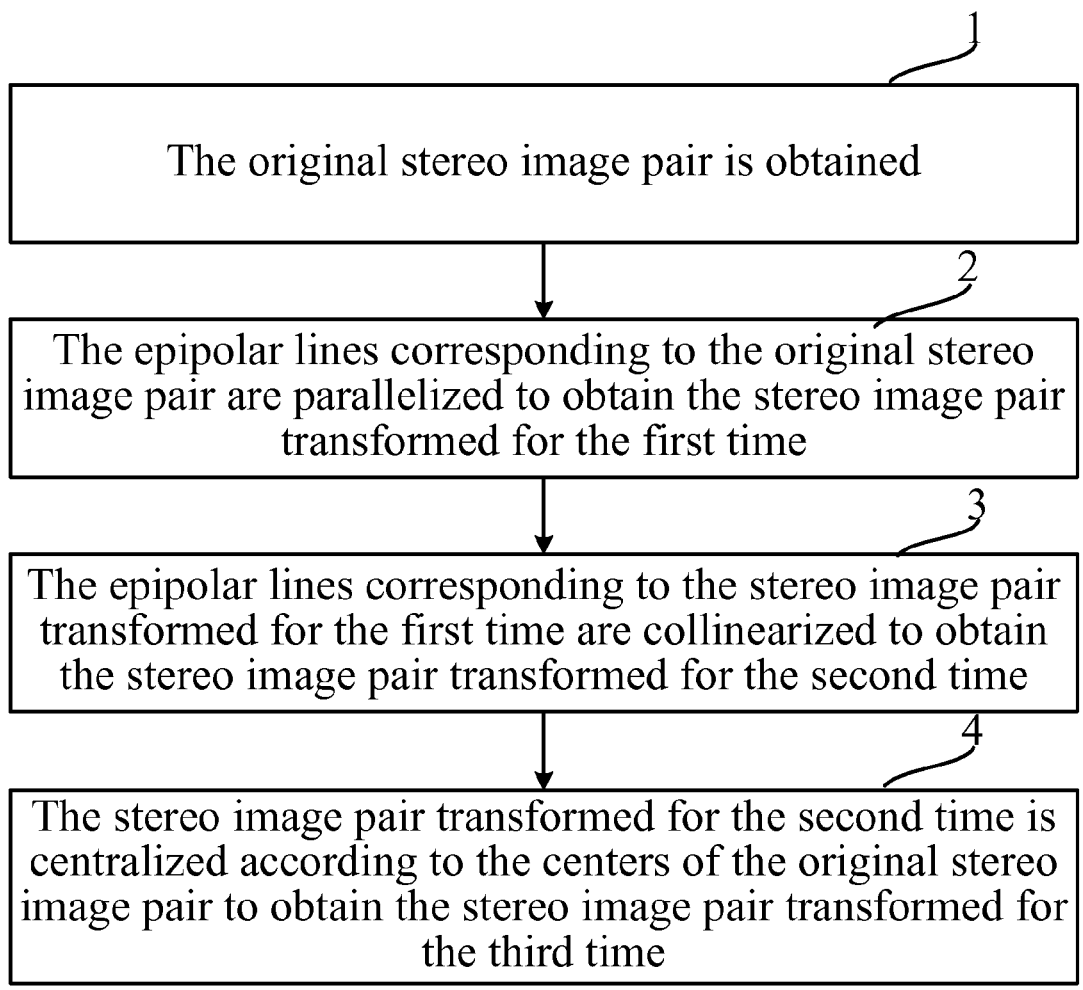
FIG. 5 shows a flowchart of a method for rectifying images according to a fourth embodiment of the present invention.

In foregoing embodiments, after parallelizing and/or collinearizing the epipolar lines, the rectified stereo image pair generally will deviate from the original stereo image pair to some extent. To minimize such deviation, centers of the rectified stereo image pair can be rectified respectively to centralize the rectified stereo image pair as far as possible. FIG. 5 shows a flowchart of a method for rectifying images according to a fourth embodiment of the present invention. In this embodiment as shown in FIG. 5, after block 3 as described in the method for rectifying images according to the first embodiment of the present invention, the following block is further performed:

Block 4: The stereo image pair transformed for the second time is centralized respectively according to the centers of the original stereo image pair to obtain the stereo image pair transformed for the third time ("third transformed stereo image pair").

In this embodiment, after the epipolar lines are parallelized and collinearized, the stereo image pair transformed for the second time is respectively centralized according to the centers of the original stereo image pair, and specifically rectified to the centers of the original images through the epipolar line rectification matrix to obtain a new rectification matrix. This helps centralize the rectified images as far as possible and minimize deviation.

In foregoing embodiments, after parallelizing and/or collinearlizing the epipolar lines, the rectified stereo image pair, relative to the original stereo image pair, may have spun or moved horizontally to some extent. This causes black edges on the image boarders. To apply parallelization and/or collinearization of the epipolar lines to the real-time video system, the black edge should be removed effectively and epipolar lines should be aligned to maximize the image area.

Figure 6:
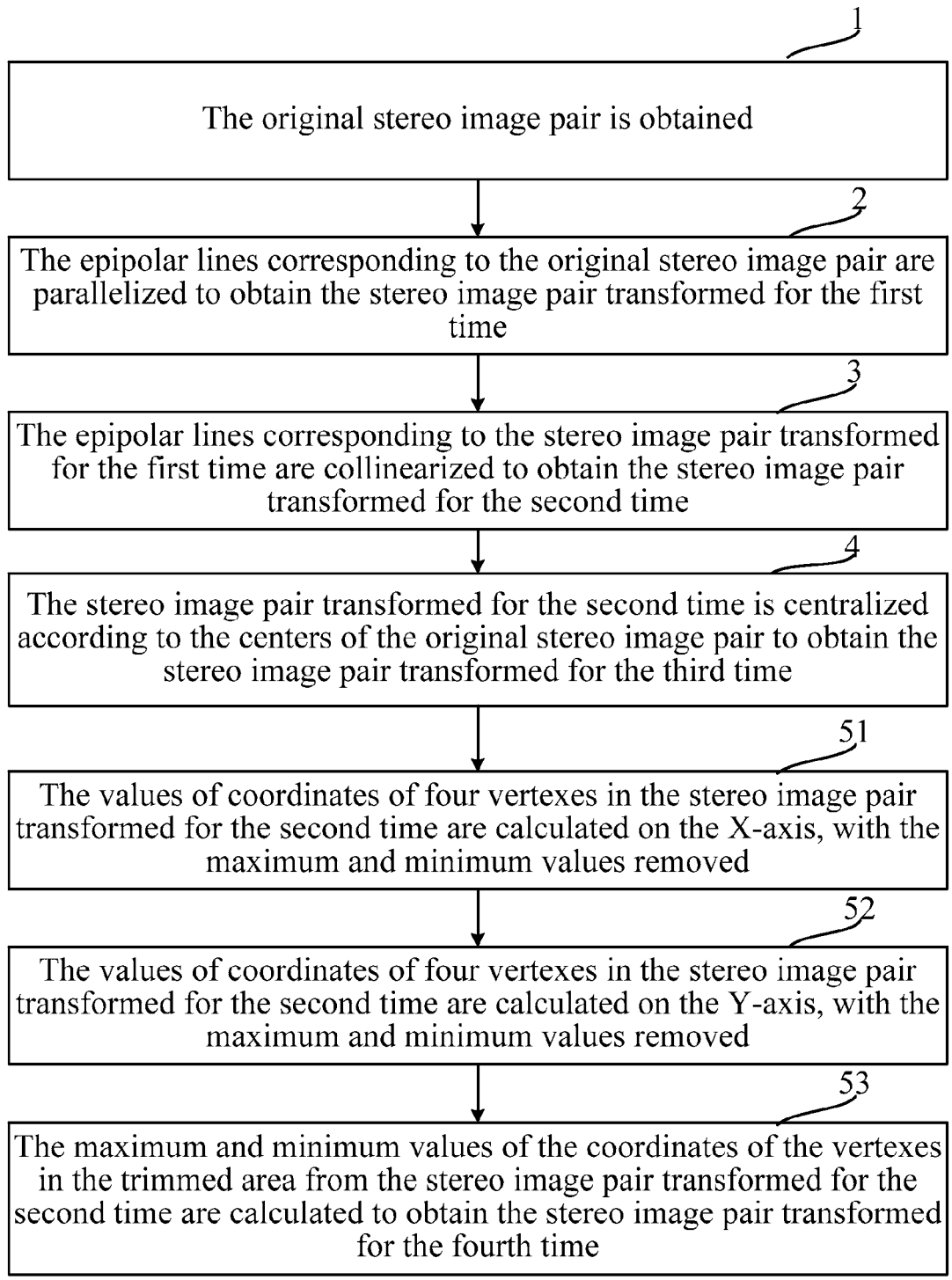
FIG. 6 shows a flowchart of a method for rectifying images according to a fifth embodiment of the present invention.

FIG. 6 shows a flowchart of a method for rectifying images according to a fifth embodiment of the present invention. In this embodiment as shown in FIG. 6, after block 4 as described in the method for rectifying images according to the fourth embodiment, the following blocks are further performed:

Block 51: Values of coordinates of the four vertexes in the stereo image pair transformed for the second time on the X-axis are calculated respectively, with the maximum and minimum values removed.

Block 52: Values of coordinates of the four vertexes in the stereo image pair transformed for the second time on the Y-axis are calculated respectively, with the maximum and minimum values removed.

Block 53: The maximum and minimum values of the coordinates of vertexes in the trimmed area from the second transformed stereo image pair are calculated respectively to obtain the fourth transformed stereo image pair transformed.

A complete flowchart of the method for rectifying images provided in the present invention is detailed below in an exemplary embodiment. In this embodiment, the stereo image is rectified without calibration.

(1) Epipolar lines are parallelized.

(11) For any stereo image point pair ($p_1$, $p_2$), the algebraic relation between the two points and basic matrix F is shown as: $p_1^T F p_2 = 0$.

This formula indicates that $p_1 \epsilon l_1 = F p_2$, and similarly, $p_2 \epsilon l_2 = F^T p_1$, where $l_1$ and $l_2$ denote respectively the epipolar lines corresponding to points $p_1$ and $p_2$.

(12) After the stereo image pair is rectified, the right and left epipoles of the virtual stereo vision system are shown as:

$$e_1 = e_2 = \begin{pmatrix} 1 \\ 0 \\ 0 \end{pmatrix}.$$

(13) After the stereo image pair is rectified, the ideal basic matrix of the virtual stereo vision system is shown as:

$$F = [e_1]_x = \begin{pmatrix} 0 & 0 & 0 \\ 0 & 0 & -1 \\ 0 & 1 & 0 \end{pmatrix}.$$

(14) After rectification, the position of the optical center and the internal parameters of the video cameras remain unchanged. Generally, two video cameras on opposite sides may differ slightly. The internal parameters of video cameras in the virtual stereo vision system can be set as the weighted average of the original internal parameters of the two video cameras on opposite sides; or the internal parameters of the left video camera can be directly assigned to the right video camera.

(15) The final projection matrixes are: $P_{newL}$ and $P_{newR}$, as shown below:

$$P_{newL} = K_L[R_{newL} \ t_{newL}] = [Q_{newL} \ q_{newL}] =$$
$$\begin{bmatrix} q_1^T & q_{14} \\ q_2^T & q_{24} \\ q_3^T & q_{34} \end{bmatrix}_{newL} = K_L[R_{newL} \ -R_{newL}O_L]$$

$$P_{newR} = K_R[R_{newR} \ t_{newR}] = [Q_{newR} \ q_{newR}] =$$
$$\begin{bmatrix} q_1^T & q_{14} \\ q_2^T & q_{24} \\ q_3^T & q_{34} \end{bmatrix}_{newR} = K_R[R_{newR} \ -R_{newR}O_R]$$

where: $R_{newL}$ denotes the spin matrix after the left video camera is rectified; $R_{newR}$ denotes the spin matrix after the right video camera is rectified; $t_{newL}$ denotes the translation vector after the left video camera is rectified; $t_{newR}$ denotes the translation vector after the right video camera is rectified; $K_L$ denotes the internal parameters of the left video camera; $K_R$ denotes the internal parameters of the right video camera; $O_L$ denotes the optical center of the left video camera; and $O_R$ denotes the optical center of the right video camera.

(16) Assuming that the original projection matrixes of the left and right video cameras are $P_{oldL}$ and $P_{oldR}$, with the structures similar to the final projection matrixes, for any space point M in the three dimensional (3D) space, the following formulae are satisfied:

$$\begin{cases} m_{oldL} \cong P_{oldL}M \\ m_{newL} \cong P_{newL}M \end{cases}$$

where $m_{oldL}$ denotes the image point of the space point M shot by the left video camera; and $m_{newL}$ denote the finally projected image point of the space point M shot by the left video camera.

Therefore, the following formula is obtained:

$$\begin{cases} M = O_L + \lambda_{old} Q_{oldL}^{-1} m_{oldL} \\ M = O_L + \lambda_{new} Q_{newL}^{-1} m_{newL}, \end{cases}$$

$$m_{newL} = \lambda Q_{newL} Q_{oldL}^{-1} m_{oldL} = T_L m_{oldL}$$

where $\lambda_{old}$ denotes the scale factor before rectification, and $\lambda_{new}$ denotes the scale factor after rectification.

$T_L$ denotes the epipolar line rectification matrix to be calculated for the left image; similarly, $T_R$ denotes the epipolar line rectification matrix to be calculated for the right left image.

(17) The image pair collected by the virtual stereo vision system is obtained. By rotating around the optical center to parallelize the optical axes, video cameras in this system have the same optical center with a real video camera. Moreover, the two video cameras in this vision system have the same focal length. Thus, the following formulae are obtained:

$$\begin{cases} (q_3)_{newL} = (q_3)_{newR} \\ (q_{34})_{newL} = (q_{34})_{newR} \end{cases}$$

where $q_3$ and $q_{34}$ denote the unique geometrical characteristics of an ideal stereo video camera system.

If the optical center is located on the virtual plane:

$$\begin{cases} P_{newL}\begin{pmatrix} O_L \\ 1 \end{pmatrix} = 0 \\ P_{newR}\begin{pmatrix} O_R \\ 1 \end{pmatrix} = 0. \end{cases}$$

(18) As shown in (12), after the epipolar lines are rectified, the epipoles of the stereo vision system are located at infinite points, then:

$$\begin{cases} e_{newL} = \begin{pmatrix} 1 \\ 0 \\ 0 \end{pmatrix} = P_{newL}\begin{pmatrix} O_R \\ 1 \end{pmatrix} \\ e_{newR} = \begin{pmatrix} 1 \\ 0 \\ 0 \end{pmatrix} = P_{newR}\begin{pmatrix} O_L \\ 1 \end{pmatrix} \end{cases}$$

where $e_{newL}$ denotes the left epipole after rectification, and $e_{newR}$ denotes the right epipole after rectification.

Corresponding relation can be obtained according to matrix equality in the advanced algebra.

Given that points $m_{newL}$ and $m_{newR}$ in the virtual stereo image pair are obtained finally: $(m_{newL})_y = (m_{newR})_y$.

In other words, after rectification, disparity between corresponding points of the virtual stereo image pair should be 0 on the Y-axis.

(19) Given that the epipolar line rectification matrixes obtained finally are $T_L$ and $T_R$, the following is obtained:

$$\begin{cases} T_L \cong Q_{newL} Q_{oldL}^{-1} \\ T_R \cong Q_{newR} Q_{oldR}^{-1}, \end{cases}$$

where $Q = KR$.

Moreover, relation between the point pair and the basic matrix after rectification and mapping between $m_{oldL}$ and $m_{oldR}$ are known, then:

$$(m_{newL})^T F(m_{newR}) = (T_L m_{oldL})^T \begin{pmatrix} 0 & 0 & 0 \\ 0 & 0 & -1 \\ 0 & 1 & 0 \end{pmatrix} (T_R m_{oldR}) = 0.$$

According to (11) to (19), the epipolar line rectification matrixes $T_L$ and $T_R$, which are used for parallelizing epipolar lines, are deduced.

(2) Epipolar lines are collinearized.

Based on the given stereo image points and basic matrix, epipolar lines $l_1$ and $l_2$ of the corresponding points can be obtained from (1). Then, distance between the two epipolar lines, namely, DeltaEpoDistance, can be calculated. By adding the DeltaEpoDistance to the coordinates of the principle point of the right video camera on the Y-axis, the internal parameters of the video camera are changed. Finally, a new rectification matrix, which is used for collinearizing epipolar lines, can be obtained from (19).

(3) Images are centralized.

I. The left image is centralized.

I1) The coordinates of the new center is obtained.

After the epipolar lines are parallelized and collinearized, the epipolar line rectification matrix for the left image is obtained to be LeftTransform. Assuming that the center point of the left image is LeftCenterPoint, the coordinates of the new center point of the left image is NewLeftCenterPoint, as shown below:

NewLeftCenterPoint=LeftTransform*LeftCenterPoint.

I2) Variation DeltaLeftCenterPoint of the center point before and after rectification is obtained, as shown below:

DeltaLeftCenterPoint=LeftCenterPoint−NewLeftCenterPoint.

I3) The new internal parameter matrix of the left video camera is obtained.

The focal length in the new internal parameter matrix remains unchanged.

Values of the X and Y coordinates of DeltaLeftCenterPoint are respectively added to values of the coordinates of the X and Y principle points.

I4) The new rectification matrix for the left image is obtained.

The new rectification matrix can be obtained through the new internal parameter matrix derived from I3) and the epipolar line rectification matrixes derived from (19).

I5) The left image is rectified through the new rectification matrix to obtain the rectified left image.

II. The right image is centralized according to the same process.

In this step, the rectified image can be centralized to minimize deviation.

(4) Images are trimmed.

I. The left image is trimmed.

I1) Four vertexes of the original left image are obtained, and their coordinates can be determined according to the size of the original left image.

I2) These four vertexes are rectified according to the obtained epipolar line rectification matrix for the left image to obtain four new rectified vertexes.

I3) The values of coordinates of the four new vertexes on the X-axis are listed. The weighted averages XL1 and XL2 on the X-axis are obtained, with the maximum and minimum values removed; similarly, the weighted averages YL1 and YL2 on the Y-axis are obtained, with the maximum and minimum values removed.

II. The right image is trimmed according to the same process.

II1) Four vertexes of the original right image are obtained, and their coordinates can be determined according to the size of the original right image.

II2) These four vertexes are rectified according to the obtained epipolar line rectification matrix for the right image to obtain four new rectified vertexes.

II3) Values of coordinates of the four new vertexes on the X-axis are listed. The weighted averages XR1 and XR2 on the X-axis are obtained, with the maximum and minimum values removed; similarly, the weighted averages YR1 and YR2 on the Y-axis are obtained, with the maximum and minimum values removed.

III. The maximum and minimum values of coordinates of the vertexes in the trimmed area are obtained.

III1) The median of XL1, XL2, XR1, and XR2 are obtained, with the maximum and minimum values removed, and by comparison, XMin and XMax are acquired.

III2) The median of YL1, YL2, YR1, and YR2 are obtained, with the maximum and minimum values removed, and by comparison, YMin and YMax are acquired.

III3) Finally, the maximum and minimum values of coordinates of the vertexes in the trimmed area are obtained.

Minimum values of coordinates of the vertex=(XMin, YMin)

Maximum values of coordinates of the vertex=(XMax, YMax)

In this step, the stereo image pair obtained by rectifying the epipolar lines and the centers is processed, with the black edges generated by rectifying epipolar lines trimmed favorably.

For the final rectified stereo image pair obtained by trimming black edges, the epipolar lines corresponding to the corresponding points in the stereo image pair are collinearized, and there is no black edge.

It is understandable for those skilled in the art that all or part of the steps in the forgoing embodiments may be performed through hardware instructed by a program. The program may be stored in a computer-readable storage medium. Steps elaborated in the foregoing embodiments are performed when the program is in operation. The storage medium includes a read-only memory (ROM), random-access memory (RAM), disk, and optical disk, and so on, which are capable of storing program codes.

A system for rectifying images is provided in the embodiments of the present invention, with the structure detailed in embodiments 1-4 and FIGS. 7-10.

Figure 7:
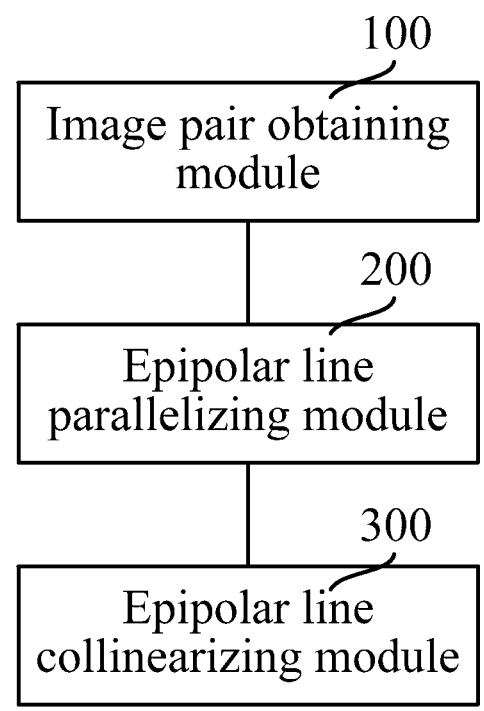
FIG. 7 shows the physical structure of a system for rectifying images according to a first embodiment of the present invention.

FIG. 7 shows a structure of a system for rectifying images according to a first embodiment of the present invention. As shown in FIG. 7, this system includes:

an image pair obtaining module 100, adapted to obtain the original stereo image pair;

an epipolar line parallelizing module 200, connected to the image pair obtaining module 100 and adapted to parallelize epipolar lines corresponding to the original stereo image pair to obtain the stereo image pair transformed for the first time; and an epipolar line collinearizing module 300, connected to the epipolar line parallelizing module 200 and adapted to collinearize epipolar lines corresponding to the stereo image pair transformed for the first time to obtain the stereo image pair transformed for the second time.

Figure 8:
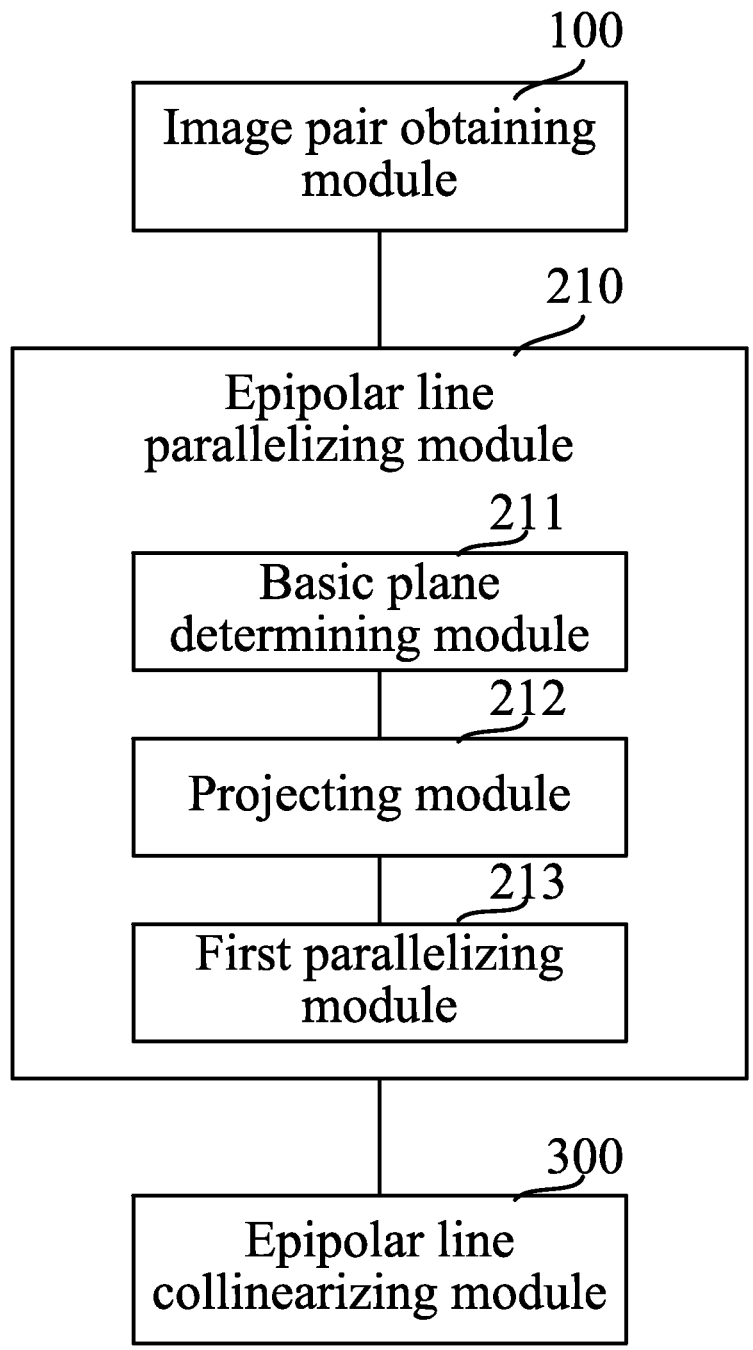
FIG. 8 shows the physical structure of a system for rectifying images according to a second embodiment of the present invention.

FIG. 8 shows a structure of a system for rectifying images according to a second embodiment of the present invention. In this embodiment, calibration is performed in rectifying stereo images. As shown in FIG. 8, the epipolar line parallelizing module 210 includes a basic plane determining module 211, a projecting module 212, and a first parallelizing module 213, which are connected in turn.

In rectifying stereo images through calibration, the epipolar line parallelizing module parallelizes the epipolar lines corresponding to the original stereo image pair, including:

determining, by the basic plane determining module 211, the basic plane according to the internal and external parameters of the binocular video camera (such as the baseline of the stereo vision system) and the plane where the original stereo image pair is located, where the basic plane can be determined by the cross product by the baseline of the binocular stereo vision system and the intersecting line of two original image planes;

projecting, by the projecting module 212, the original stereo image pair onto the basic plane to obtain the projected stereo image pair; and parallelizing, by the first parallelizing module 213, the epipolar lines corresponding to the projected stereo image pair.

Figure 9:
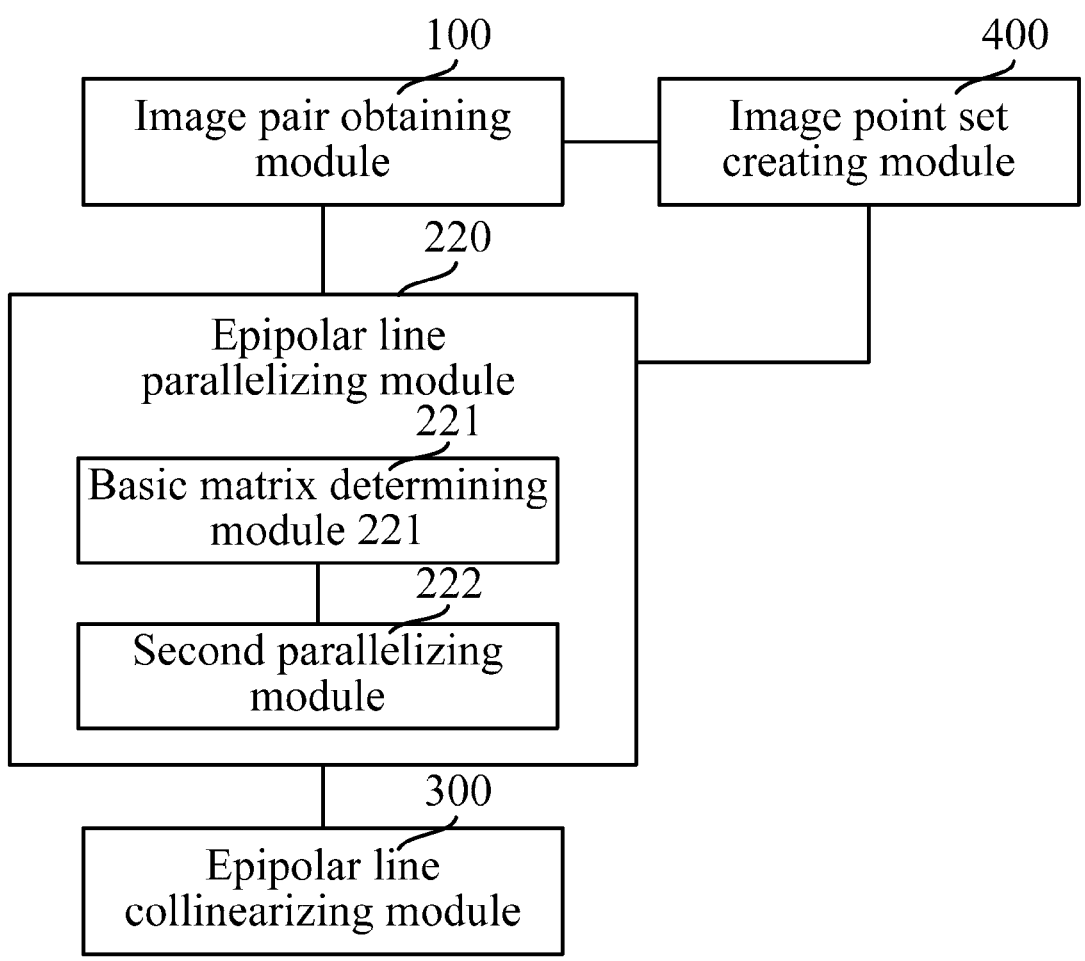
FIG. 9 shows the physical structure of a system for rectifying images according to a third embodiment of the present invention.

FIG. 9 shows a structure of a system for rectifying images according to a third embodiment of the present invention. In this embodiment, the stereo image is rectified without calibration, with the premises that a point pair set that contains a series of coordinates of corresponding points is given. As shown in FIG. 9, the system for rectifying images provided in this embodiment further includes: an image point pair set creating module 400, connected to the image pair obtaining module 100 and the epipolar line parallelizing module 220 respectively and adapted to create and save the stereo image point pair set.

The image point pair set can be created as follows: angular point sets need to be obtained from the image pair through the angular point extraction algorithm respectively, mapping between angular points in the two angular point sets needs to be established through the feature matching method, and then point pair sets are established, in which two corresponding angular points form a point pair.

The epipolar line parallelizing module 220 includes: a basic matrix determining module 221 and a second parallelizing module 222, which are connected in turn.

In rectifying stereo images without calibration, the epipolar line parallelizing module parallelizes the epipolar lines corresponding to the original stereo image pair, including:

selecting, by the basic matrix determining module 221, any one of stereo image point pairs from the stereo image point pair set;

calculating the basic matrix according to the stereo image point pair; and parallelizing, by the second parallelizing module 222, the epipolar lines corresponding to the original stereo image pair according to the basic matrix.

Compared to the system for rectifying images provided in the second embodiment, this embodiment provides good adaptability as images are rectified without calibration.

Figure 10:
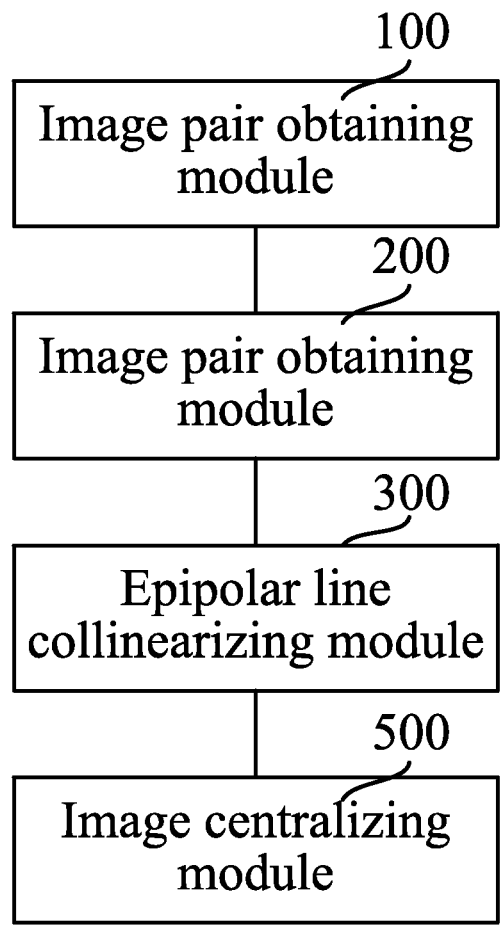
FIG. 10 shows the physical structure of a system for rectifying images according to a fourth embodiment of the present invention.

FIG. 10 shows a structure of a system for rectifying images according to a third embodiment of the present invention. As shown in FIG. 10, compared with the system for rectifying images provided in the first embodiment of the present invention, the system for rectifying images in this embodiment further includes: an image centralizing module 500, connected to the epipolar line collinearizing module 300 and adapted to centralize the stereo image pair transformed for the second time according to the centers of the original stereo image pair to obtain the stereo image pair transformed for the third time.

Figure 11:
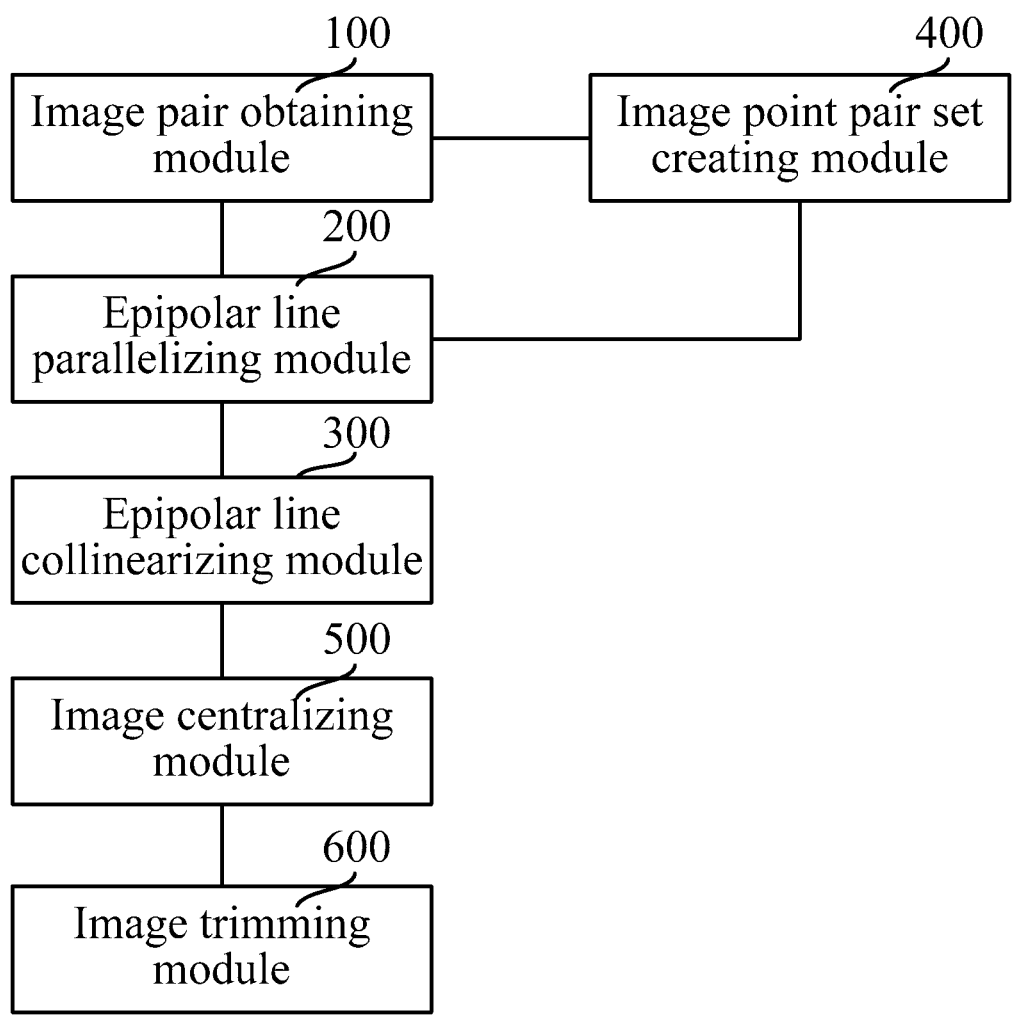
FIG. 11 shows the physical structure of a system for rectifying images according to a fifth embodiment of the present invention.

FIG. 11 shows a structure of a system for rectifying images according to a fourth embodiment of the present invention. As shown in FIG. 11, compared with the system for rectifying images provided in the second embodiment, the system for rectifying images provided in this embodiment further includes:

an image centralizing module 500, connected to the epipolar line collinearizing module 300 and adapted to centralize the stereo image pair transformed for the second time according to the centers of the original stereo image pair to obtain the stereo image pair transformed for the third time; and an image trimming module 600, connected to the epipolar line collinearizing module 300 and adapted to respectively calculate the values of coordinates of four vertexes in the stereo image pair transformed for the second time on the X-axis, with the maximum and minimum values removed; respectively calculate the values of coordinates of four vertexes in the stereo image pair transformed for the second time on the Y-axis, with the maximum and minimum values removed; and obtain the maximum and minimum values of coordinates of the vertexes in the trimmed area from the stereo image pair transformed for the second time to obtain the stereo image pair transformed for the fourth time.

The present invention is mainly applied to pre-processing of images, and in particular to pre-processing of stereo images and stereo video images and to three dimension reconstruction. Moreover, this invention is applicable to terminal products related to stereo images and videos, such as stereo mobile phones, stereo TV sets, and stereo displays.

In accordance with the description on the foregoing embodiments, it is obvious to those skilled in the art that this invention can be implemented by hardware or by a combination of software and generic hardware. Based on such understanding, the technical solution of the present invention can be implemented by software products. Such products, which can be saved in a non-losable storage media (for example, CD-ROM, U disks, and mobile disks), includes a series of commands to enable a computing device (for example, PC, server, or network device) to implement the methods elaborated in the embodiments of the present invention.

In view of the above, although the present invention has been described through several exemplary embodiments, the invention is not limited to these embodiments. Any modification, equivalent replacement, and improvement made without departing from the spirit and principle of the present invention shall fall within the scope of the present invention.

What is claimed is:

1. A method for rectifying an image, comprising:
    obtaining, by a computing device, an original stereo image pair;
    parallelizing, by the computing device, epipolar lines corresponding to the original stereo image pair to obtain a first transformed stereo image pair; and
    collinearizing, by the computing device, epipolar lines corresponding to the first transformed stereo image pair to obtain a second transformed stereo image pair,
    wherein obtaining of the original stereo image pair further comprises creating a stereo image point pair set by the computing device comprises:
    obtaining two angular point sets through angular point extraction;
    establishing mapping between angular points in the two angular point sets through feature matching, and
    creating the stereo image point pair set comprising two corresponding angular points.

2. The method for rectifying images according to claim 1, wherein the parallelizing of the epipolar lines corresponding to the original stereo image pair comprises:
    determining, by the computing device, a basic plane according to a baseline of a stereo vision system and a plane where the original stereo image pair is located;
    projecting, by the computing device, the original stereo image pair onto the basic plane to obtain a projected stereo image pair; and
    parallelizing, by the computing device, epipolar lines corresponding to the projected stereo image pair.

3. The method for rectifying images according to claim 1, wherein the parallelizing of the epipolar lines corresponding to the original stereo image pair comprises:
    randomly selecting a stereo image point pair from the stereo image point pair set; calculating a basic matrix according to the stereo image point pair; and
    parallelizing the epipolar lines corresponding to the original stereo image pair according to the basic matrix.

4. The method for rectifying images according to claim 1, further comprising:
    centralizing the second transformed stereo image pair according to centers of the original stereo image pair to obtain a third transformed stereo image pair.

5. The method for rectifying images according to claim 4, further comprising:
    calculating values of coordinates of four vertexes in the second transformed stereo image pair on an X-axis respectively, with maximum and minimum values removed;
    calculating values of coordinates of four vertexes in the second transformed stereo image pair on a Y-axis respectively, with maximum and minimum values removed; and
    calculating maximum and minimum values of coordinates of vertexes in a trimmed area from the second transformed stereo image pair to obtain a fourth transformed stereo image pair.

6. A system for rectifying images, comprising a non-transitory storage medium accessible to a processor, the non-transitory storage medium comprising:
    an image pair obtaining module, configured to obtain, by the system, an original stereo image pair;
    an epipolar line parallelizing module, connected to the image pair obtaining module and configured to, by the system, parallelize epipolar lines corresponding to the original stereo image pair to obtain a first transformed stereo image pair;
    an epipolar line collinearizing module, connected to the epipolar line parallelizing module and configured to, by the system, collinearize epipolar lines corresponding to the first transformed stereo image pair to obtain a second transformed stereo image pair; and
    an image point pair set creating module, connected to the image pair obtaining module and the epipolar line parallelizing module respectively and adapted to create and save a stereo image point pair set,
    wherein the image point pair set creating module is further configured to obtain two angular point sets through angular point extraction;
    establish mapping between angular points in the two angular point sets through feature matching, and
    create the stereo image point pair set comprising two corresponding angular points.

7. The system for rectifying images according to claim 6, wherein the epipolar line parallelizing module comprises:
    a basic plane determining module, adapted to determine a basic plane according to a baseline of a stereo vision system and a plane where the original stereo image pair is located;
    a projecting module, connected to the basic plane determining module and adapted to project the original stereo image pair onto the basic plane to obtain a projected stereo image pair; and
    a first parallelizing module, connected to the projecting module and adapted to parallelize epipolar lines corresponding to the projected stereo image pair.

8. The system for rectifying images according to claim 1, wherein the epipolar line parallelizing module comprises:
    a basic matrix determining module, adapted to randomly select a stereo image point pair from the stereo image point pair set, and calculate a basic matrix according to the stereo image point pair; and a second parallelizing module connected to the basic matrix determining module and adapted to parallelize the epipolar lines corresponding to the original stereo image pair according to the basic matrix.

9. The system for rectifying images according to claim 6, further comprising:
an image centralizing module, connected to the epipolar line collinearizing module and adapted to centralize the stereo image pair transformed for the second time according to centers of the original stereo image pair to obtain a third transformed stereo image pair.

10. The system for rectifying images according to claim 9, further comprising: an image trimming module, connected to the epipolar line collinearizing module and adapted to respectively calculate values of coordinates of four vertexes in the second transformed stereo image pair on an X-axis, with maximum and minimum values removed; respectively calculate values of coordinates of four vertexes in the second transformed stereo image pair on a Y-axis, with maximum and minimum values removed; and obtain maximum and minimum values of coordinates of vertexes in a trimmed area from the second transformed stereo image pair to obtain a fourth transformed stereo image pair.

11. The system for rectifying images according to claim 9, further comprising: an image trimming module, connected to the image centralizing module and adapted to respectively calculate values of coordinates of four vertexes in the second transformed stereo image pair on an X-axis, with maximum and minimum values removed; respectively calculate values of coordinates of four vertexes in the second transformed stereo image pair transformed on a Y-axis, with maximum and minimum values removed; and obtain maximum and minimum values of coordinates of vertexes in a trimmed area from the second transformed stereo image pair to obtain a fourth transformed stereo image pair.

12. A computing device comprising a processor and a non-transitory storage accessible to the processor, configured to:
obtain an original stereo image pair;
parallelize epipolar lines corresponding to the original stereo image pair to obtain a first transformed stereo image pair; and
collinearize epipolar lines corresponding to the first transformed stereo image pair to obtain a second transformed stereo image pair,
wherein the computing device obtains the original stereo image pair by creating a stereo image point pair set through angular point extraction and feature matching,
wherein the computing device, further configured to:
obtain two angular point sets through angular point extraction;
establish mapping between angular points in the two angular point sets through feature matching, and
create the stereo image point pair set comprising two corresponding angular points.

* * * * *